United States Patent [19]

Sasaki et al.

[11] 4,247,443
[45] Jan. 27, 1981

[54] AROMATIC POLYIMIDE RESIN COMPOSITION

[75] Inventors: Ichiro Sasaki; Hiroshi Itatani; Mikito Kashima, all of Chiba; Hataaki Yoshimoto, Ichihara; Shuji Yamamoto, Chiba; Yoshikazu Sasaki, Takatsuki, all of Japan

[73] Assignee: Ube Industries, Ltd., Ube, Japan

[21] Appl. No.: 67,166

[22] Filed: Aug. 16, 1979

[30] Foreign Application Priority Data

Aug. 17, 1978 [JP] Japan ................................ 53-99554
Aug. 23, 1978 [JP] Japan ................................ 53-101848

[51] Int. Cl.$^3$ .............................................. C08K 5/13
[52] U.S. Cl. ................................................ 260/33.4 P
[58] Field of Search ..................................... 260/33.48

[56] References Cited

U.S. PATENT DOCUMENTS

| | | | |
|---|---|---|---|
| 3,666,709 | 5/1972 | Suzuki et al. | 260/33.4 P |
| 3,870,674 | 3/1975 | Farrissey, Jr. et al. | 260/33.4 P |
| 4,075,171 | 2/1978 | D'Alelio | 260/33.4 P |

FOREIGN PATENT DOCUMENTS 4213544  8/1963  Japan ................................ 260/33.4 P

*Primary Examiner*—Joseph L. Schofer
*Assistant Examiner*—Peter F. Kulkosky
*Attorney, Agent, or Firm*—Finnegan, Henderson, Farabow, Garrett & Dunner

[57] ABSTRACT

An aromatic polyimide resin composition useful for producing a film or sheet, comprises 2% by weight or more of an imide polymer having at least 90 molar % of a recurring unit of the formula (I):

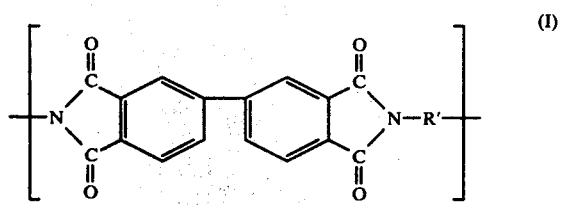

wherein R' is a divalent aromatic radical, and dissolved in an organic polar solvent consisting essentially of one or more halogenated phenol compounds of the formulae (II) or (III):

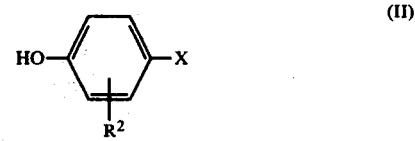

and

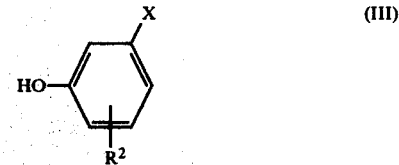

wherein $R^2$ is a hydrogen atom of a $C_{1-3}$ alkyl radical and is a halogen atom, the halogenated phenol compound having a melting point of 100° C. or less and a boiling point of 300° C. or less.

12 Claims, No Drawings

AROMATIC POLYIMIDE RESIN COMPOSITION

The present invention relates to an aromatic polyimide resin composition. More particularly, the present invention relates to an aromatic polyimide composition comprising an aromatic polyimide resin having a high molecular weight and a high content of imide structure, and which is dissolved in a high concentration in an organic polar solvent.

It is known that an aromatic polyimide having a high molecular weight and a high content of imide structure can be produced by carrying out successively an operation for polycondensing an aromatic tetracarboxylic acid with an aromatic diamine and another operation for converting the resulting polycondensation product, that is, a polyamic acid, into the corresponding polyimide resin. It is also known that this type of aromatic polyimide resin is suitable for producing various shaped articles, for example, film and sheet, and the resultant shaped aromatic polyimide resin articles exhibit an excellent heat-resisting property and superior mechanical strength.

Moreover, it is known that the polyimide resin having a great molecular weight and a high content of the imide structure either has a very high melting point or, sometimes, does not melt. Therefore, polyimide resin can not be shaped by conventional shaping methods, for example, T-die extruding, injection molding, and insulation molding. Consequently, the shaping of the polyimide resin can be effected only by using a solution of the resin. However, a solvent which is capable of dissolving the aromatic polyimide resin having a high molecular weight and a high content of imide structure, in a high concentration, has not yet been discovered. Accordingly, until the present invention, it was impossible to provide the shaped aromatic polyimide resin articles directly from a solution of the resin in a solvent. Therefore, the shaped aromatic polyimide resin articles were prepared in such a conventional method that: an aromatic polyamic acid resin, which was a precursory polymer of the corresponding polyimide resin, was dissolved in a solvent; the resultant aromatic polyamic acid solutiion was shaped into a desired form; the solvent was removed from the shaped solution so as to provide a precursory shaped article consisting of the polyamic acid resin, and; then, the precursory shaped article was heated at an elevated temperature, so as to convert the polyamic acid resin into the corresponding polyimide resin. The above-mentioned method was the only method known for providing the shaped aromatic polyimide resin articles having an excellent heat-resisting property and superior mechanical strength.

The above-mentioned method for producing the shaped aromatic polyimide resin articles has a disadvantage in that the conversion of the polyamic acid into the corresponding polyimide results in production of water. The production of water causes the resultant polyimide to be depolymerized. Accordingly, in order to produce a high quality of the shaped aromatic polyimide resin articles, it is necessary to completely remove the produced water from the shaped article during the conversion. However, the complete removal of the water without deterioration in quality of the resultant shaped article is very difficult. Especially, the removal of water is extremely difficult when the shaped article has a large thickness. This type of method accordingly, can not be applied to thick articles. Another disadvantage of the above-mentioned method resides in the fact that the polyamic acid in the solution exhibits a poor chemical stability and is decomposed with the lapse of time. Therefore, it is difficult to store the polyamic acid solution for a long period of time without deterioration thereof.

In view of the excellent heat-resisting property and mechanical strength of the aromatic polyimide resin having a high content of imide structure and a high molecular weight, if it is possible to provide a composition comprising an aromatic polyimide resin dissolved in a high concentration in a solvent, the composition will be very useful for directly producing various shaped articles in a simple, easy process. Also, the composition will be useful for producing coating materials, varnish materials and bonding materials. Under these circumstances, various attempts were made to provide an aromatic polyimide resin which is soluble in usual solvents or to find solvents which are capable of dissolving the aromatic polyimide resins.

For example, Japanese Patent Application Laying-open No. 50-113597 (1975) discloses a solution of an aromatic polyimide resin in a phenol compound. The solution is prepared in such a manner that a mixture of 3,3',4,4'-biphenyl tetracarboxylic acid with an aromatic diamine is heated in an organic polar solvent consisting of a phenol compound, such as xylenol and cresol, at a temperature of 80° C. or more, preferably, from 120° to 200° C., while removing the resultant water from the reaction mixture and while dissolving the resultant polyimide resin in the solvent. However, in this case, the resultant polyimide exhibits a low molecular weight and a low content of imide structure. This type of polyimide resin solution is improper for producing shaped polyimide resin articles having a high heat-resisting property and excellent physical properties. Therefore, this type polyimide resin solution can be utilized only as a varnish material for coating electric wires.

Japanese Patent Publication Nos. 46-17145 (1971), 47-23191 (1972), 47-26878 (1972) and 48-26958 (1973) each disclose a solution of a polyimide resin in a phenol compound. This solution is prepared by reacting 3,3',4,4'-benzophenone tetracarboxylic acid with an aromatic diamine in a phenol compound, at an elevated temperature. However, each of the resultant polyimide resins exhibit a low molecular weight and a low content of less than 90 molar % of imide structure. This type of polyimide resin solutions is merely usable as a varnish material and is useless for producing shaped polyimide resin articles having excellent mechanical strength.

The above-mentioned conventional polyimide resins which are soluble in a high concentration in usual organic polar solvents, such as phenol compounds, are a polyimide-polyamic acid type resin having a low molecular weight and a low content of the imide structure. The conventional polyimide-polyamic acid type resin is merely usable as a varnish and is useless for producing shaped articles, such as film and sheet, having a high mechanical strength and a superior heat-resisting property.

An object of the present invention is to provide an aromatic polyimide resin composition comprising an aromatic polyimide resin having a high molecular weight and a high content of imide structure, which resin is dissolved in a high concentration in an organic polar solvent.

Another object of the present invention is to provide an aromatic polyimide resin composition which can take the state of a fluidal solution at a temperature of 100° C. or less.

Still another object of the present invention is to provide an aromatic polyimide resin composition which is useful for directly producing various shaped articles such as film, sheet and laminate.

A further object of the present invention is to provide an aromatic polyimide resin composition useful as a coating material, varnish and bonding material.

The above-mentioned objects can be attained by the aromatic polyimide resin composition of the present invention which comprises:

at least 2% by weight of at least one imide polymer having at least 90 molar % of a recurring unit of the formula (I):

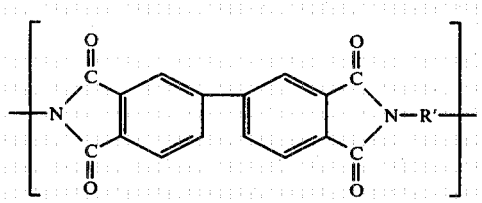

wherein R' represents a divalent aromatic radical, and;

the balance consisting of an organic polar solvent consisting of at least one halogenated phenol compound having a melting point of 100° C. or less and a boiling point of 300° C. or less, and selected from the group consisting of those of the formulae (II) and (III):

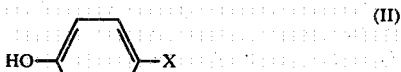

and

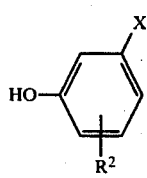

wherein $R^2$ represents a member selected from the group consisting of a hydrogen atom and alkyl radicals having 1 to 3 carbon atoms, and X represents a halogen atom, the imide polymer being dissolved in said organic polar solvent.

The aromatic imide polymer usable for the present invention has 90 molar % or more, preferably, 95 molar % or more, of the recurring unit of the formula (I):

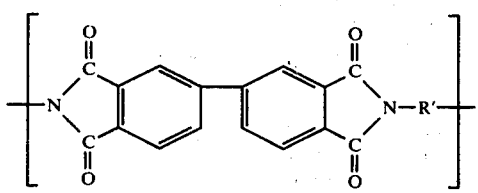

If the content of the recurring unit in the imide polymer is less than 90 molar %, the resultant aromatic imide polymer will exhibit a poor mechanical strength and heat-resisting property.

The aromatic imide polymer preferably has a high molecular weight and, therefore, preferably exhibits a high degree of logarithmic (inherent) viscosity of from 0.5 to 6.0, more preferably, from 0.6 to 4.5, still more preferably, from 0.7 to 3.5.

The aromatic imide polymer can be produced by the successive or simultaneous polycondensation and imide ring-cyclization operations. In the polycondensation operation, tetracarboxylic acid component comprising at least 90 molar % of 3,3',4,4'-biphenyl tetracarboxylic acid or its anhydride, ester or salt, is polycondensed with diamine component consisting of at least one aromatic diamine compound. In the inside ring-cyclization operation, the polycondensation product, that is, a polyamic acid, is converted into the corresponding imide polymer. The polycondensation and the imide ring-cyclization can be effected by any conventional methods.

It is preferable that the aromatic imide polymer usable for the present invention be produced in such a manner that 3,3',4,4'-biphenyl tetracarboxylic acid or its anhydride, ester of salt and an aromatic diamine, in the same molar amounts, are dissolved in an organic polar solvent, for example, N-methylpynolidone, N,N-dimethyl acetamide, N,N-midethyl formamide, dimethyl sulfoxide and tetramethyl urea, the solution is heated at a temperature of 80° C. or less, preferably, from 0° to 60° C., so as to polycondense the above-mentioned compounds into a polyamic acid preferably having a logarithmic viscosity of 1.2 or more, more preferably, from 1.5 to 6.0, which is measured at a concentration of 0.5 g of the polyamic acid per 100 ml of N-methyl-2-pyrrolidone, at a temperature of 30° C., the resultant polyamic acid solution is heated at a temperature of from 100° to 300° C., preferably, from 120° to 250° C., in the presence or absence of an imide ring-cyclization accelerator consisting of a tertiary amine, for example, trimethylamine, triethylamine or pyridine, so as to convert the polyamic acid into the corresponding imide polymor containing 90% or more of the recurring unit of the formula (I), which polymer is insoluble in the solvent, and then, the deposited polymer is separated from the reaction mixture.

The aromatic imide polymer may be produced by another method in which the polyamic acid having a lagorithmic viscosity of 1.2 or more, is prepared in the same manner as that mentioned above; the polyamic acid is separated from the reaction mixture in such a manner that a large amount of acetone or ethyl alcohol is added to the polyamic acid-containing reaction mixture, so as to cause the polyamic acid to be precipitated from the reaction mixture, or in such a manner that the solvent is eliminated from the reaction mixture, and, then, the separated polyamic acid is heated at a temperature of from 150° to 300° C., preferably, from 160° to 250° C., so as to convert the polyamic acid into the corresponding imide polymer having 90% or more of the recurring unit of the formula (I). In above-mentioned methods, the imide polymer is obtained in the form of solid powder.

The aromatic imide polymer usable for the present invention may be in the form of fine crystalline particles each having a size of from 0.2 to 10 microns, preferably, 1 to 5 microns, or in the form of aggregations, each consisting of numerous crystalline particles mentioned above, and having a size of from 1 to 5000 microns, preferably, 5 to 500 microns. The aromatic imide polymer in the above-mentioned forms can be easily dissolved in a halogenated phenol compound solvent at a high dissolving rate. However, the aromatic imide polymer is not limited to the above-mentioned forms.

The 3,3′,4,4′-biphenyl tetracarboxylic acid to be used for the production of the aromatic imide polymer, may be in the state of a free acid, anhydride, salt, ester, or a mixture of two or more of the above-mentioned state.

In the production of the aromatic imide polymer usable for the present invention, the tetracarboxylic acid component may contain, in addition to 3,3′,4,4′-biphenyl tetracarboxylic acid, 10 molar % or less, preferably, 5 molar % or less of one or more other tetracarboxylic acids, for example, pyromellitic acid, 2,3,6,7-naphthalene tetracarboxylic acid, 2,3,3′,4′-biphenyl tetracarboxylic acid, 2,2′,3,3′-biphenyl tetracarboxylic acid, 3,3′,4,4′-benzophenone tetracarboxylic acid, 2,2-bis (3,4-dicarboxyphenyl) propane, bis (3,4-dicarboxyphenyl) sulfone, bis (3,4-dicarboxyphenyl) ether and butane tetracarboxylic acid. The additional tetracarboxylic acid may be in the state of a free acid, anhydride, salt, ester or a mixture of two or more of the above-mentioned state.

The diamine component for producing the imide polymer, consists of at least one aromatic diamine of the formula (IV):

wherein R′ is the same as that defined hereinabove. The aromatic diamine of the formula (IV) is preferably selected from the group consisting of those of the formulae (V) and (VI):

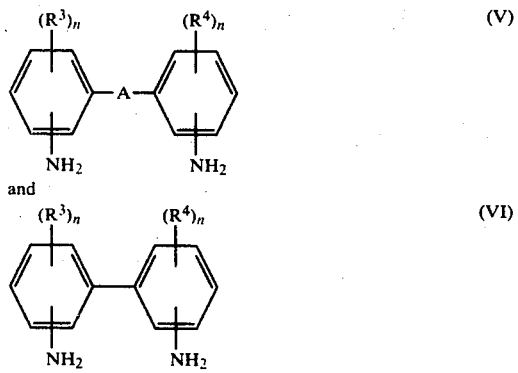

wherein $R^3$ and $R^4$ respectively, independently from each other, represent a member selected from the group consisting of hydrogen atoms, lower alkyl radicals, preferably, having 1 to 3 carbon atoms, alkoxy radicals, preferably, having 1 to 3 carbon atoms, n represents an integer of from 1 to 4, and A represents a divalent radical selected from the group consisting of —O—, —S—, —CO—, —SO$_2$—, —SO—, —CH$_2$— and —C(CH$_3$)$_2$—.

The aromatic diamines of the formula (V) may involve diamino-diphenyl ether compounds, for example, 4,4′-diaminodiphenyl ether, 3,3′-dimethyl-4,4′-diaminodiphenyl ether 3,3′-diaminodiphenyl ether and 3,3′-dimethoxy-4,4′-diaminodiphenyl ether; diaminodiphenyl thioether compounds, for example, 4,4′-diaminodiphenyl thioether, 3,3′-dimethyl-4,4′-diaminodiphenyl-thioether, 3,3′-diethoxy-4,4′-diaminodiphenyl-thioether, and, 3,3′-diaminodiphenyl thioether; diaminobenzophenone compounds, for example, 4,4′-diaminobenzophenone and 3,3′-dimenthyl-4,4′-diaminobenzophenone; 4,4′-diaminodiphenyl sulfoxide; 4,4′-diaminodiphenyl sulfone; 3,3′-diaminodiphenyl sulfone; diaminodiphenyl methane compounds, for example, 4,4′-diaminodiphenyl methane, 3,3′-diaminodiphenyl methane, 3,3′-dimethoxy-4,4′-diaminodiphenyl methane and 3,3′-dimethyl-4,4-diaminodiphenyl methane, and; diaminodiphenyl propane compounds, for example, 2,2-bis (4′-aminophenyl) propane and 2,2-bis (3′-aminophenyl) propane.

The aromatic diamines of the formula (IV) may involve benzidine, 3,3′-dimethyl benzidine, 3,3′-dimethoxybenzidine and 3,3′-diaminophenyl.

More preferable aromatic imide polymers are prepared from a tetracarboxylic acid component consisting of 3,3′,4,4′-biphenyl tetracarboxylic anhydride and a diamine component consisting of one or more aromatic diamines selected from the group consisting of 4,4′-diaminodiphenyl ether, 4,4′-diaminodiphenyl thioether and 4,4′-diaminodiphenyl methane. In this case, the resultant aromatic imide polymer exhibits excellent mechanical properties and heat-resisting property. The 4,4′-diaminodiphenyl ether may be used either alone or as a mixture of 40 molar % or more, preferably, 50 molar % or more, of the 4,4′-diaminodiphenyl ether and the balance consisting of one or more other aromatic diamines, for example, 4,4′-diamino-3,3′-dimethyl biphenyl, 4,4′-diaminodiphenyl thioether, 4,4′-diaminodiphenyl methane and 4,4′-diamino-3,3′-dimethyldiphenyl ether. In this case, the resultant aromatic imide polymer is very useful, for the composition of the present invention, due to the excellent mechanical properties and heat-resisting property thereof.

In the aromatic polyimide resin composition of the present invention, the imide polymer is dissolved in an organic solvent consisting essentially of one or more halogenated phenol compounds, each having a melting point of 100° C. or less, preferably, 80° C. or less, and a boiling point of 300° C. or less, preferably, 280° C. or less, and each selected from the group consisting of those of the formulae (II) and (III):

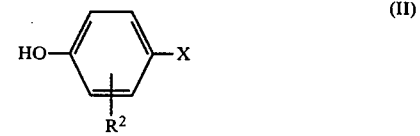

and

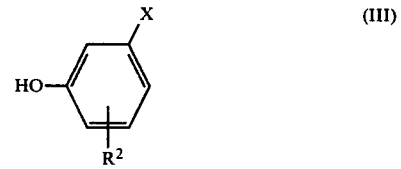

wherein $R^2$ represents a member selected from the group consisting of a hydrogen atom and alkyl radicals having 1 to 3 carbon atoms, for example, methyl, ethyl, propyl and dimethylmethyl radicals, and X represents a halogen atom, such as a chlorine, bromine, fluorine or iodine atom. When in the formulae (II) and (III), $R^2$ is a hydrogen atom or a methyl radical and X is a chlorine or bromine atom, the halogenated phenol compound exhibits an excellent stability at an elevated temperature, and therefore, is very preferable for the composition of the present invention.

The halogenated phenol compounds having a melting point higher than 100° C. are not usable for the present invention, because some of resultant composition cannot be in the state of a fluidal solution at a temperature of 100° C. or less. Also, the halogenated phenol compounds having a boiling point higher than 300° C. are useless for the present invention, because when the resultant composition is used for the production of the shaped articles, it is very difficult to evaporate away the halogenated phenol compound from the shaped article.

Also, it is preferable that the halogenated phenol compound can not be decomposed without evaporating it at an elevated temperature. If the halogenated phenol compound is decomposed during the process for producing a shaped article from the composition, it will be impossible to recover the halogenated phenol compound from the shaped article and to reuse the recovered compound for the preparation of the composition.

Also, in the aromatic polyimide resin composition of the present invention, the halogenated phenol compounds of the formulae (II) and (III) cannot be replaced with other phenol compounds, for example, o-halogenated phenol compounds and cresol and phenol compounds having no halogen atom. This is because the other phenol compounds cannot dissolve therein the aromatic imide polymer of the present invention in a high concentration of 2% by weight or more. That is, it is impossible to prepare the composition of the present invention by using the other phenol compounds.

The halogenated phenol compounds of the formulae (II) and (III) may be selected from the group consisting of m-chlorophenol, p-chlorophenol, m-bromophenol, p-bromophenol, 2-chloro-4-hydroxytoluene, 2-chloro-5-hydroxytoluene, 3-chloro-6-hydroxytoluene, 4-chloro-2-hydroxytoluene, 2-bromo-4-hydroxytoluene, 2-bromo-5-hydroxytoluene, 3-bromo-5-hydroxy-toluene, 3-bromo-6-hydroxytoluene and 4-bromo-2-hydroxytoluene.

More preferable organic polar solvent may consist of at least one member selected from the halogenated phenol compound group consisting of p-chlorophenol, m-chlorophenol, p-bromophenol, m-bromophenol, 2-chloro-4-hydroxytoluene, 2-chloro-5-hydroxytoluene and 3-chloro-6-hydroxytoluene. This type of solvent is effective for dissolving the aromatic imide polymer in a high concentration therein. Especially, p-chlorophenol, m-chlorophenol, p-bromophenol, m-bromophenol and mixtures of two or more of the above-mentioned phenol compounds are most preferable as the organic polar solvent for the aromatic imide polymer. This is because these compounds exhibit a relatively low melting point of from 30° to 65° C. and, therefore, can dissolve the imide polymer at a relatively low temperature of from an atmospheric temperature to 55° C., and the resultant composition can exhibit a proper degree of fluidity at the relatively low temperature. This type of composition is very useful for easily producing the shaped articles, and also, as a coating material, varnish and bonding material having a proper fluidity at atmospheric temperature or slightly higher.

The organic polar solvent usable for the present invention may contain, in addition to the halogenated phenol compounds of the formulae (II) and (III), at least one additional compound selected from the group consisting of phenol, o-, m- and p-cresols, 2-chlorophenol 2,4-dichlorophenol, nitrophenols, nitrobenzene, toluene, pyridine, aniline, N-methylpyrrolidone, N,N-dimethyl acetamide, N,N-dimethyl formamide, dimethyl sulfoxide and 2-methyl pyrrolidone, in an amount of 10% or less, preferably, 5% or less, based on the weight of the halogenated phenol compounds. In order to dissolve the imide polymer in a high concentration of 2% or more, it is necessary that the content of the additional compound in the organic polar solvent not exceed 10%, based on the weight of the halogenated phenol compounds.

The aromatic polyimide resin composition contains the imide polymer in a content of 2% by weight or more, preferably, from 3 to 30% by weight, more preferably, from 5 to 15% by weight.

The aromatic polyimide resin composition of the present invention may be prepared by any conventional method. For example, the composition may be prepared by such a method that a predetermined amount of the imide polymer in the state of fine particles or of aggregations of the fine particles, is dispersed in the organic polar solvent, the dispersion is heated at a temperature higher than the melting point but lower than the boiling point of the solvent, while stirring the dispersion, so as to dissolve the imide polymer in the solvent. This method is preferable for the preparation of the composition, because the dissolving operation is simple and easy, the dissolving time is short and the concentration of the imide polymer in the composition can be easily adjusted to a desired value.

The composition of the present invention can be easily diluted with an additional amount of the halogenated phenol compound.

The composition of the present invention exhibits a proper rotation viscosity of 2 poises or more, preferably, 5 to 100,000 poises, at a concentration of 10% by weight of the imide polymer at a temperature of 80° C. Accordingly, the composition can be directly utilized not only for producing the shaped articles, for example, film and sheet, but also, as a coating material or varnish for coating electric wires or a bonding material.

When the composition of the present invention is used for the production of the shaped articles, it is preferable that the rotation viscosity of the composition be adjusted to a value of from 5 to 50,000 poises, more preferably, from 10 to 30,000 poises, at a temperature of 80° C. The adjustment of the rotation viscosity can be effected by using, as a solvent, a halogenated phenol compound having a proper melting point or by diluting the composition with a proper halogenated phenol compound.

The composition of the present invention contains the imide polymer but substantially not the corresponding polyamic acid. Therefore, during the preparation of the shaped articles from the composition, substantially no imide ring-cyclization which causes the generation of water occurs. Moreover, since the imide polymer has a high molecular weight, the resultant shaped article can exhibit an excellent mechanical strength and a superior heat-resisting property.

Since the imide polymer is stable, the composition of the present invention can be stored for a long period of time without deterioration in the quality thereof. This is one of the superior advantages of the composition of the present invention over the conventional composition containing the polyamic acid which is deteriorated with the lapse of time.

The shaped articles, especially, film, can be produced by the following method.

An aromatic polyimide resin composition in the state of a fluidal solution, preferably having a rotation viscosity of from 10 to 30,000 poises at a temperature of 80° C., is shaped into a desired form by any conventional shaping methods. For example, the composition is cast into a film having a thickness of 5 to 800 microns by spreading the composition on a horizontal glass or copper plate. This casting may be continuously carried out by spreading the composition on a peripheral surface of a rotating drum or roll. The shaped composition is heated at a temperature of from 50° to 500° C., preferably, 50° to 350° C., more preferably, 60° to 320° C., still more preferably, 80° to 300° C., under an atmospheric pressure or a reduced pressure so as to evaporate away the solvent from the shaped composition.

In order to obtain a high quality of the shaped article, especially, thin film, it is preferable that the elevation of the temperature and the reduction of the pressure are effected gradually, more preferably, stepwise. This is effective for uniformly and completely removing the solvent from the shaped article.

The evaporated solvent can be easily recovered by cooling it and the recovered solvent can be reused for the preparation of the composition, because the halogenated phenol compounds of the formulae (II) and (III) are very stable and are not decomposed during the evaporating operation.

The above-mentioned method is effective for producing a polyimide resin film having a thickness of 3 to 500 microns and a higher tensile strength than that of the conventional polyimide resin film which has been converted from a polyamic acid film.

The shaped polyimide resin article thus produced may be heat treated at a temperature of from 250° C. to 550° C., preferably, from 280° to 500° C., for a short time of, for example, from 1 to 30 minutes. This heat treatment is effective for enhancing the mechanical strength of the shaped article.

The present invention will be further illustrated by means of the following examples, which are only illustrative and not limitative thereof.

In the following examples, the logarithmic viscosity of polymers was determined by the following method.

In the case of a polyamic acid, the polymer is dissolved at a concentration of 0.5 g in 100 ml of N-methyl-2-pyrrolidone. The viscosity of the solution was measured at a temperature of 30° C.

In the case of a polyimide resin, the resin was dissolved at a concentration of 0.5 g in 100 ml of 4-chlorophenol. The viscosity of the solution was measured at a temperature of 50° C.

The measured value of the viscosity of the solution was converted into a logarithmic (inherent) viscosity of the polymer or resin in accordance with the following equation.

Logarithmic viscosity $(\psi)$ =
$$\frac{\text{natural logarithm}\left(\frac{\text{viscosity of solution}}{\text{viscosity of solvent}}\right)}{\text{Concentration of polymer in solution}}$$

The content of imide structure in the imide polymer was determined by the following method.

An imide polymer in the form of fine particles was subjected to an infrared-ray absorption specrum analysis. The amount of the imide structure was determined from heights of absorption peaks at 1780 cm$^{-1}$ and 1720 cm$^{-1}$, and the amount of the amide structure was determined from height of absorption peaks at 3300 cm$^{-1}$ and 1640 cm$^{-1}$.

The rotation viscosity of the composition was determined by using a rotation viscometer (the trademark of which was VISCONIC-E and which was made by Tokyo KEIKI K. K.) at a temperature of 50° C. The measured viscosity was indicated in the unit of centipoise.

EXAMPLES 1 THROUGH 9

In each of the Examples 1 through 7, a polyamic acid was prepared by the following method.

540 g of 3,3',4,4'-biphenyl tetracarboxylic dianhydride (which will be referred to as S-BPDA hereinafter), 360 g of 4,4'-diaminodiphenyl ether (which will be referred to as DADE hereinafter) and 6.6 liters of N-methyl purrolidone were simultaneously placed into a cylydrical polymerization vessel having an inside space of 14 liters. The charge was stirred at atmospheric temperature for 6 hours. The resultant polymerization mixture contained 12% by weight of a polyamic acid having a logarithmis viscosity of 2.8. The polymerization mixture also exhibited of a rotation viscosity of 6,000 centipoises.

2 Kg of the above-obtained polyamic acid solution (polymerization mixture) was placed in a three-neck flask with a stirrer, thermometer and reflux condenser having a vessel for receiving water, and mixed with 100 ml of triethylamine. The mixture was heated gradually to a temperature of from 140° to 200° C. over a period of 3 hours, while removing water distilled from the mixture. A yellow imide polymer in the form of fine crystalline particles was precipitated from the mixture. The imide polymer was separated from the mixture by means of filtering and washed with methyl alcohol, and then, with acetone. The washed imide polymer was dried at a temperature of 100° C. An imide polymer in the form of aggregations of fine particles was obtained. The imide polymer exhibited a logarithmic viscosity of 1.18 and a content of imide structure (the recurring unit of the formula (I)) of 95% or more. The fine particles had an average size of about 2 microns, and the aggregations had an average size of about 50 microns.

The imide polymer in an amount as indicated in Table 1 was dispersed in a melt of a halogenated phenol compound of the type as indicated in Table 1, in an amount as indicated in Table 1. The dispersion was heated at a temperature of from 110° to 120° C., for 30 minutes, while stirring it. A solution of the imide polymer in the halogenated phenol compound was obtained.

In order to evaluate the solubility of the imide polymer in the halogenated phenol compound, the above-obtained solution was cooled to a temperature of 50° C., and the amount of the precipitated imide polymer was measured. Also, the rotation viscosity of the solution was measured.

In Example 8, the same procedures as those mentioned in Examples 1 through 7, were carried out, except that the polymerization operation for producing the polyamic acid was carried out at a temperature of 70° C. and the resultant polyamic acid exhibited a logarithmic viscosity of 0.91.

In Example 9, procedures identical to those mentioned in Examples 1 through 7 were conducted, except that the polymerization of the polyamic acid was effected at a temperature of 10° C. and the resultant polyamic acid had a logarithmic viscosity of 1.25.

The results of Examples 1 through 9 are shown in Table 1.

TABLE 1

| Example No. | Imide polymer Component Tetracarboxylic acid | Diamine | Logarithmic viscosity (50° C.) | Content of recurring unit of formula (I) % | Composition Amount of polymer (g) | Halogenated phenol compound Type | Amount (g) | Solubility test (amount (g) of precipitation) | Rotation viscosity (CP) (50° C.) | (70° C.) |
| --- | --- | --- | --- | --- | --- | --- | --- | --- | --- | --- |
| 1 | S-BPDA | DADE | 1.18 | >95 | 2 | 4-chlorophenol | 20 | 0 | 19000 | — |
| 2 | " | " | " | " | 3 | " | 20 | 0 | 36000 | — |
| 3 | " | " | " | " | 2 | 4-bromophenol | 20 | 0 | 64000 | 35000 |
| 4 | " | " | " | " | 1 | 3-chlorophenol | 10 | 0 | — | — |
| 5 | " | " | " | " | 1 | 2-chloro-5-hydroxytoluene | 10 | 0 | 31000 | — |
| 6 | " | " | " | " | 1 | 2-chloro-4-hydroxytoluene | 10 | 0 | — | — |
| 7 | " | " | " | " | 1 | 3-chloro-6-hydroxytoluene | 10 | 0 | 9000 | — |
| 8 | " | " | 0.91 | " | 1 | 4-chlorophenol | 10 | 0 | 6000 | — |
| 9 | " | " | 1.25 | " | 1 | " | 10 | 0 | 29000 | — |

EXAMPLES 10 THROUGH 17

In each of the Examples 10 through 17, procedures identical to those mentioned in Example 1 through 7 were carried out, except that the diamine component consisted of the compond or compounds as indicated in Table 2, and the resultant polyamic acid exhibited a logarithmic viscosity and a content of the recurring unit of the formula (I) as respectively indicated in Table 2.

The results are shown in Table 2.

for a period of 6 months or more without deterioration and deposit of the imide polymers.

COMPARISON EXAMPLES 1 THROUGH 8

In each of the Comparison Examples 1 through 8, procedures identical to those mentioned in Examples 1 through 7 were carried out, except that the tetracarboxylic acid component and the diamine component respectively consisted of a compound as indicated in Table 3, the resultant polyamic acid exhibited a loga-

TABLE 2

| Example No. | Imide polymer Component Tetracarboxylic acid | Diamine (proportion in part by weight) | Logarithmic viscosity (50° C.) | Content of recurring unit of formula (I) % | Composition Amount of polymer (g) | Halogenated phenol compound Type | Amount (q) | Solubility test (amount (q) of precipitation) | Rotation viscosity (CP) (50° C.) | (70° C.) |
| --- | --- | --- | --- | --- | --- | --- | --- | --- | --- | --- |
| 10 | S-BPDA | DADM | 1.17 | >95 | 1 | 4-chlorophenol | 10 | 0 | 18000 | — |
| 11 | " | DADT | 1.17 | " | 1 | " | 10 | 0 | 29000 | — |
| 12 | " | DADE(5) DADT(5) | 1.16 | " | 1 | " | 10 | 0 | — | — |
| 13 | " | DADE(9) DADT(1) | 1.19 | " | 1 | " | 10 | 0 | — | — |
| 14 | " | DMB | 0.85 | " | 1 | " | 10 | 0 | 4900 | — |
| 15 | " | DADE(5) DMB (5) | 1.19 | " | 1 | " | 10 | 0 | — | — |
| 16 | " | DADE(9) DMB (1) | 1.18 | " | 1 | " | 10 | 0 | — | — |
| 17 | " | DADE(9) DADM(1) | 1.21 | " | 1 | " | 10 | 0 | — | — |

Note:
DADM; 4,4'-diamimodiphenyl methane
DADT; 4,4'-diamimodiphenyl thioether
DMB; 3,3'-dimethyl benzidine Tables 1 and 2 clearly show that the compositions of Examples 1 through 17 contained the imide polymers completely dissolved in a high concentration of from about 9% to about 13%, in the halogenated phenol compound solvents, at a temperature of 50° C. All of the compositions of Examples 1 through 17 could be stored rithmic viscosity and a content of the recurring unit of the formula (I) respectively indicated in Table 3, and the composition was prepared by using the imide polymer in an amount as indicated in Table 3, and a phenol compound of a type and in an amount respectively indicated in Table 3.

The results are shown in Table 3.

TABLE 3

| Example No. | Imide polymer Component Tetracarboxylic acid | Imide polymer Component Diamine | Logarithmic viscosity (50° C.) | Content of recurring unit of formula (I) % | Composition Amount of polymer (q) | Composition Halogenated phenol compound Type | Composition Halogenated phenol compound Amount (g) | ΔSolubility test (amount (g) of precipitation) | Rotation viscosity (CP) (50° C.) | Rotation viscosity (CP) (70° C.) |
|---|---|---|---|---|---|---|---|---|---|---|
| 1 | S-BPDA | DADE | 1.18 | 95 | 1 | 2-chlorophenol | 15 | 0.78 | 10 | — |
| 2 | " | " | " | " | 2 | m-cresol | 20 | 1.66 | " | — |
| 3 | " | " | " | " | 2 | p-cresol | 20 | 1.61 | " | — |
| 4 | " | " | " | " | 2 | 4-chlorotoluene | 20 | 1.75 | " | — |
| 5 | " | " | " | " | 1 | 2,3-dichlorophenol | 10 | 0.86 | " | — |
| 6 | " | DADM | 1.17 | " | 1 | m-cresol | 10 | 0.77 | " | — |
| 7 | PMDA | DADE | 1.05 | " | 2 | 4-chlorophenol | 20 | 1.88 | " | — |
| 8 | " | " | " | " | 1 | m-cresol | 10 | 0.94 | " | — |
| 9 | " | " | " | " | 2 | 4-chlorotoluene | 20 | 1.87 | " | — |

Note:
PMDA: pyromellitic dianhydride

Table 3 clearly shows that, except for Comparison Example 6, the comparative compositions of Comparison Examples 1 through 9 contain the imide polymers dissolved in a small concentration of less than 2% in the solvents. Also, the comparative compositions exhibited poor degree of rotation viscosity of less than 10 centipoises at a temperature of 50° C.

EXAMPLE 18

The polyimide resin composition of Example 1 was spread on a horizontal molding glass plate on which the molding area was defined with flames, at a temperature of 50° C., to form a film of the composition. The film of the composition was heated at a temperature of 150° C., under a reduced pressure of 1 mm Hg, so as to solidify the film of the composition by evaporating away the 4-chlorophenol from the film. Thereafter, the resultant polyimide resin film was heat-treated at a temperature of 300° C., for 20 minutes. The resultant film had a thickness of about 45 microns.

The film was subjected to a DTA (differential thermal analysis). In accordance with the result of the DTA, the thermal decomposition of the film in the atmosphere was started at a temperature of 525° C. and vigorously conducted at a temperature of 630° C.

Also, the film was subjected to a mechanical property test at a temperature of 25° C., in accordance with ASTM D882-64T. It was found that the tensile strength of the film at a yield point was 13.5 Kg/mm$^2$, the tensile strength of the film at break was 19.8 Kg/mm$^2$ and the ultimate elongation of the film was 58%.

EXAMPLE 19

The polyimide resin composition of Example 1 was utilized as a varnish for coating a mild steel wire having a diameter of 1 mm. The coated wire was heat-treated at a temperature of 100° C. for 30 minutes, and additionally heated at a temperature of 200° C. for 30 minutes. The resultant insulated electric wire exhibited the following properties.
  Dielectric breakdown strength: 13.7 KV
  Resistance to abrasion under a load of 700 g: >100 abrasions
  Thermal softening temperature: >500° C.

EXAMPLE 20

Procedures identical to those mentioned in Example 18 were carried out, except that before the film-forming operation, the composition was heated from 50° C. to 120° C., so as to reduce the rotation viscosity thereof to about 5,000 centipoises, the film of the composition was heated at a temperature of about 140° C., for one hour, under a reduced pressure of 1 mm Hg, so as to evaporate away the 4-chlorophenol solvent from the composition, and then, the film was heated at a temperature of about 300° C., for 20 minutes. The resultant film had a thickness of about 40 microns and exhibited tensile strengths of 13.5 Kg/mm$^2$ at its yield point and of 19.8 Kg/mm$^2$ at its break point, and an ultimate elongation of 58%.

The film was aged at a temperature of 350° C., for 8 hours. The aged film exhibited a tensile strength at break of 14.6 Kg/mm$^2$ and an ultimate elongation of 17%.

EXAMPLE 21

The same procedures as those mentioned in Example 20 were carried out, except that the composition of Example 3 was used for preparing a film 40 about microns thick. The fiom exhibited a tensile strength at yield point of 12.7 Kg/mm$^2$, a tensile strength at break of 15.6 Kg/mm$^2$ and an ultimate elongation of 48%.

EXAMPLE 22

The same procedures as those mentioned in Example 20 were carried out, except that the composition of Example 7 was used for a film having a thickness of about 40 microns. The film exhibited a tensile strength of 13.3 Kg/mm$^2$ at its yield point, a tensile strength of 17.3 Kg/mm$^2$ at its break and an ultimate elongation of 65%.

EXAMPLE 23

The same procedure as those mentioned in Example 20 were carried out, except that the composition of Example 8 was used for producing a film. The film exhibited a tensile strength of 13.2 Kg/mm$^2$ at its yield point, a tensile strength of 17.2 Kg/mm$^2$ at its break point and an ultimate elongation of 55%.

EXAMPLE 24

The same procedures as those described in Example 20 were carried out, except that the composition of Example 9 was used for preparing a film. The film exhibited a tensile strength of yield point of 13.5 Kg/mm$^2$, a tensile strength at break point of 20.0 Kg/mm² and an ultimate elongation of 80%.

EXAMPLE 25

The same procedures as those described in Example 20 were carried out, except that the composition of Example 10 was used for producing a film. The film exhibited a tensile strength at yield point of 14.2 Kg/mm², a tensile strength at break point of 15.7 Kg/mm² and an ultimate elongation of 44%.

EXAMPLE 26

The same procedures as those described in Example 20 were carried out, except that the composition of Example 11 was used to produce a film. The film exhibited a tensile strength at yield point of 14.0 Kg/mm², a tensile strength at break point of 15.3 Kg/mm² and an ultimate elongation of 40%.

EXAMPLE 27

The same procedures as those mentioned in Example 20 were carried out, except that the composition of Example 14 was used to prepare a film. The film exhibited a tensile strength at break point of 16.9 Kg/mm².

COMPARISON EXAMPLE 10

An aromatic polyimide resin film was prepared in accordance with the method as described in Example 20, except that the same polyamic acid solution as that mentioned in example 1 was spread on the glass plate, and after drying at a temperature of 120° C., the resultant film was gradually heated from 120° C. to 200° C. for one hour and additionally heated from 200° C. to 300° C. for one hour, so as to convert the polyamic acid to the corresponding polyimide. The resultant film exhibited a tensile strength at yield point of 13.4 Kg/mm², a tensile strength at break point of 15.0 Kg/mm² and an ultimate elongation of 46%.

COMPARISON EXAMPLE 11

One gram of the same imide polymer as that described in Example 1 was mixed with 10 g of m-cresol. The mixture was heated at a temperature of from 110° to 120° C., for 30 minutes, while stirring the mixture. Only 0.17 g of the imide polymer were dissolved in m-cresol, and the remaining amount of the imide polymer was deposited. The resultant solution was improper for producing a film of the imide polymer due to the low concentration of the imide polymer in the solution. Accordingly, such a film could not be produced from the solution.

What we claim is:

1. An aromatic polyimide resin composition comprising:
    at least 2% by weight of at least one imide polymer having at least 90 molar % of a recurring unit of the formula (I):

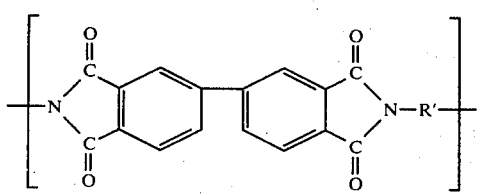

wherein R' represents a divalent aromatic radical, and;

the balance consisting of an organic polar solvent consisting essentially of at least one halogenated phenol compound having a melting point of 100° C. or less and a boiling point of 300° C. or less, and selected from the group consisting of those of the formulae (II) and (III):

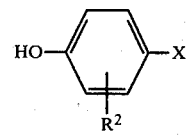   (II)

and

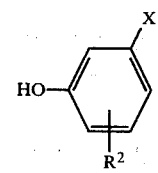   (III)

wherein R² represents a member selected from the group consisting of a hydrogen atom and alkyl radicals having 1 to 3 carbon atoms, and X represents a halogen atom, said imide polymer being dissolved in said organic polar solvent.

2. An aromatic polyimide resin composition as claimed in claim 1, wherein said imide polymer exhibits a logarithmic viscosity of from 0.5 to 6.0, determined at a concentration of 0.5 g/100 ml, in 4-chloro phenol, at a temperature of 50° C.

3. An aromatic polyimide resin composition as claimed in claim 1, wherein the content of said recurring unit of the formula (I) in said imide polymer is 95 molar % or more.

4. An aromatic polyimide resin composition as claimed in claim 1, wherein said imide polymer is prepared by the polycondensation and the imide ring cyclization of a tetracarboxylic acid component comprising 90 molar % or more of 3,3',4,4'-biphenyl tetracarboxylic acid or its anhydride, salt or ester with a diamine component consisting essentially of at least one aromatic diamine selected from the group consisting of those of the formula (IV):

$$H_2N-R'-NH_2 \quad (IV)$$

where R' is the same as that defined above.

5. An aromatic polyimide resin composition as claimed in claim 4, wherein said tetracarboxylic acid component contains 10 molar % or less of at least one additional tetracarboxylic acid selected from the group consisting of pyromellitic acid, 2,3,6,7-naphthalene tetracarboxylic acid, 2,3,3',4'-biphenyl tetracarboxylic acid, 2,2',3,3'-biphenyl tetracarboxylic acid, 3,3',4,4'-benzophenone tetracarboxylic acid, 2,2-bis(3,4-dicarboxyphenyl)propane, bis(3,4-dicarboxyphenyl)sulfone, bis(3,4-dicarboxyphenyl)ether, and butane tetracarboxylic acid, and anhydrides, salts and esters of the above-named acids.

6. An aromatic polyimide resin composition as claimed in claim 4, wherein said aromatic diamine of the formula (IV) is selected from the group consisting of those of the formula (V) and (VI):

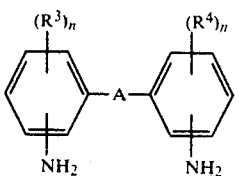

and

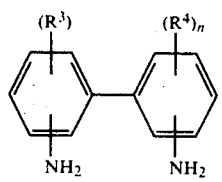

wherein $R^3$ and $R^4$ respectively, independently from each other, represent a member selected from the group consisting of a hydrogen atom, lower alkyl radicals and lower alkoxy radicals, n represents an integer of from 1 to 4, and A represents a divalent radical selected from the group consisting of —O—, —S—, —CO—, —SO$_2$—, —SO—, —CH$_2$— and —C(CH$_3$)$_2$—.

7. An aromatic polyimide resin composition as claimed in claim 1, wherein said halogenated phenol compound is selected from the group consisting of m-chlorophenol, p-chlorophenol, m-bromophenol, p-bromophenol, 2-chloro-4-hydroxytoluene, 2-chloro-5-hydroxytoluene, 3-choloro-6-hydroxytoluene, 4-chloro-2-hydroxytoluene, 2-bromo-4-hydroxytoluene, 2-bromo-5-hydroxytoluene, 3-bromo-5-hydroxy-toluene, 3-bromo-6-hydroxytoluene, 4-bromo-2-hydroxytoluene.

8. An aromatic polyimide resin composition as claimed in claim 1, wherein said organic polar solvent contains at least one additional compound selected from the group consisting of phenol, o-, m-, and p-cresols, 2,4-dichlorophenol, nitrophenols, nitrobenzene, toluene, pyridine, aniline, N-methyl pyrrolidone, N,N-dimenthyl acetamide, N,N-dimethyl formamide, dimethyl sulfoxide and 2-methyl pyrrolidone, in an amount of 10% or less based on the weight of said halogenated phenol compound.

9. An aromatic polyimide resin composition as claimed in claim 1, wherein the content of said imide polymer is in a range of from 3 to 30% by weight.

10. A film made by shaping said aromatic polyimide resin composition of claim 1 into a film and by removing said organic polar solvent from said film-shaped composition.

11. Coating material comprising said aromatic polyimide resin composition as claimed in claim 1.

12. Bonding material comprising said aromatic polyimide resin composition as claimed in claim 1.

* * * * *